United States Patent
Byun

(10) Patent No.: US 9,809,103 B2
(45) Date of Patent: Nov. 7, 2017

(54) TRANSMISSION FOR HYBRID VEHICLE

(71) Applicant: Hyundai Motor Company, Seoul (KR)

(72) Inventor: Sung Gon Byun, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 222 days.

(21) Appl. No.: 14/701,986

(22) Filed: May 1, 2015

(65) Prior Publication Data
US 2016/0144702 A1    May 26, 2016

(30) Foreign Application Priority Data
Nov. 26, 2014 (KR) .......................... 10-2014-0166509

(51) Int. Cl.
| | |
|---|---|
| *F16H 3/08* | (2006.01) |
| *B60K 6/36* | (2007.10) |
| *F16H 3/00* | (2006.01) |
| *B60K 6/442* | (2007.10) |
| *B60K 6/52* | (2007.10) |
| *B60K 6/547* | (2007.10) |

(52) U.S. Cl.
CPC ............... *B60K 6/36* (2013.01); *B60K 6/442* (2013.01); *B60K 6/52* (2013.01); *B60K 6/547* (2013.01); *F16H 3/006* (2013.01); *F16H 2003/008* (2013.01); *F16H 2200/0043* (2013.01); *Y02T 10/6234* (2013.01); *Y02T 10/6265* (2013.01); *Y10S 903/919* (2013.01)

(58) Field of Classification Search
CPC .................................. F16H 3/32; F16H 3/093
USPC ................................................... 74/330, 331
See application file for complete search history.

(56) References Cited

U.S. PATENT DOCUMENTS

| | | | |
|---|---|---|---|
| 9,133,911 B2 * | 9/2015 | Kwon | ..................... F16H 3/093 |
| 2010/0032218 A1 | 2/2010 | Ideshio et al. | |
| 2011/0028262 A1 | 2/2011 | Yamamoto et al. | |
| 2011/0036652 A1 | 2/2011 | Honda et al. | |
| 2012/0021861 A1 | 1/2012 | Sakai et al. | |
| 2013/0345018 A1 * | 12/2013 | Kaltenbach | .............. B60K 6/48 477/5 |

(Continued)

FOREIGN PATENT DOCUMENTS

| | | |
|---|---|---|
| JP | 2008-149908 A | 7/2008 |
| JP | 2012-201117 A | 10/2012 |

(Continued)

*Primary Examiner* — Ha D Ho
(74) *Attorney, Agent, or Firm* — Morgan Lewis & Bockius LLP

(57) ABSTRACT

A transmission for a hybrid vehicle includes an input shaft connected to an engine, an output shaft disposed in parallel with the input shaft, a first hollow shaft installed on an outer peripheral surface of one side of the input shaft, a second hollow shaft installed on an outer peripheral surface of the other side of the input shaft, a first motor connected to the first hollow shaft, a second motor connected to the second hollow shaft, a first speed-shifting output part provided between the first hollow shaft and the output shaft, a second speed-shifting output part provided between the second hollow shaft and the output shaft, a first synchronizer synchronously connecting the first hollow shaft to the first speed-shifting output part, and a second synchronizer synchronously connecting the second hollow shaft to the second speed-shifting output part.

12 Claims, 8 Drawing Sheets

(56) References Cited

U.S. PATENT DOCUMENTS

| | | | |
|---|---|---|---|
| 2013/0345019 A1* | 12/2013 | Kaltenbach | B60K 6/387 |
| | | | 477/5 |
| 2014/0000412 A1 | 1/2014 | Kaltenbach | |
| 2014/0162824 A1 | 6/2014 | Choi et al. | |
| 2014/0357442 A1 | 12/2014 | Sakai et al. | |

FOREIGN PATENT DOCUMENTS

| | | |
|---|---|---|
| KR | 2010-0124330 A | 11/2010 |
| KR | 2011-0013241 A | 2/2011 |
| KR | 2011-0112440 A | 10/2011 |
| KR | 2014-0080638 A | 7/2014 |

\* cited by examiner

TRANSMISSION FOR HYBRID VEHICLE

CROSS-REFERENCE TO RELATED APPLICATION

The present application is based on and claims the benefit of priority to Korean Patent Application No. 10-2014-0166509, filed on Nov. 26, 2014, the entire contents of which is incorporated herein for all purposes by this reference.

BACKGROUND OF THE INVENTION

Field of the Invention

The present disclosure relates to a transmission for a hybrid vehicle, and more particularly, to a transmission for a hybrid vehicle capable of increasing speed-shifting efficiency, improving fuel efficiency, and being driven in series and parallel modes by implementing speed-shifting multi-staging in electric vehicle (EV)/hybrid electric vehicle (HEV) driving modes.

Description of Related Art

A hybrid vehicle means a vehicle driven by efficiently combining two or more kinds of power sources with each other, and mainly means a vehicle driven by an engine obtaining a torque by burning fuel (fossil fuel such as gasoline, or the like) and an electric motor obtaining a torque by electric power of a battery.

The hybrid vehicle is the future vehicle including the engine and the motor to promote a decrease in exhaust gas and improvement of fuel efficiency, and research into the hybrid vehicle has been actively conducted in accordance with the demands of the times for improvement of fuel efficiency and development of an environmentally friendly product.

The hybrid vehicle is classified into a series type hybrid vehicle, a parallel type hybrid vehicle, and the like. Here, the series type hybrid vehicle is a hybrid system which includes the engine and the motor, but in which the engine generates only electricity and supplies the electricity to the motor and the battery and force for driving wheels driving the vehicle is provided by only the electric motor, and the parallel type hybrid vehicle has the engine and the motor both of which provide the force for driving the wheels.

Meanwhile, a hybrid vehicle capable of implementing both of series and parallel modes has been developed.

However, in the hybrid vehicle according to the related art, frictional elements using oil pressure, such as a clutch, a brake, and the like, are used in a transmission, such that speed-shifting efficiency and power transfer efficiency are decreased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission for a hybrid vehicle capable of increasing speed-shifting efficiency and power transfer efficiency, significantly improving fuel efficiency, and being driven in series and parallel modes by implementing speed-shifting multi-staging in electric vehicle (EV)/hybrid electric vehicle (HEV) driving modes.

According to an exemplary embodiment of the present disclosure, a transmission for a hybrid vehicle includes: an input shaft connected to an engine, an output shaft disposed in parallel with the input shaft, a first hollow shaft installed on an outer peripheral surface of one side of the input shaft, a second hollow shaft installed on an outer peripheral surface of the other side of the input shaft, a first motor connected to the first hollow shaft, a second motor connected to the second hollow shaft, a first speed-shifting output part provided between the first hollow shaft and the output shaft, a second speed-shifting output part provided between the second hollow shaft and the output shaft, a first synchronizer synchronously connecting the first hollow shaft to the first speed-shifting output part, and a second synchronizer synchronously connecting the second hollow shaft to the second speed-shifting output part.

The first hollow shaft may have two or more first input gears formed on an outer peripheral surface thereof, and the first synchronizer may be installed between the first input gears of the first hollow shaft to synchronously connect selectively the first input gears to the first speed-shifting output part, and the second hollow shaft may have two or more second input gears formed on an outer peripheral surface thereof, and the second synchronizer may be installed between the second input gears of the second hollow shaft to synchronously connect selectively the second input gears to the second speed-shifting output part.

The first speed-shifting output part may have a first speed-shifting shaft and a plurality of first speed-shifting gears formed on an outer peripheral surface of the first speed-shifting shaft, and the second speed-shifting output part may have a second speed-shifting shaft and a plurality of second speed-shifting gears formed on an outer peripheral surface of the second speed-shifting shaft.

The first synchronizer may be configured so as to synchronously connect selectively the first input gears to the first speed-shifting gears of the first speed-shifting shaft, and the second synchronizer may be configured so as to synchronously connect selectively the second input gears to the second speed-shifting gears of the second speed-shifting shaft.

A connection mechanism may be installed at a portion at which the first and second hollow shafts are adjacent to each other and synchronously connect selectively the first and second hollow shafts to the input shaft.

The connection mechanism may be configured of a synchronizer.

The first hollow shaft, the first motor, the first synchronizer, and the first speed-shifting output part may be disposed at a portion adjacent to a front wheel of the vehicle, and the second hollow shaft, the second motor, the second synchronizer, and the second speed-shifting output part may be disposed at a portion adjacent to a rear wheel of the vehicle.

The input shaft may be extended between the front and rear wheels of the vehicle, a first connection mechanism may be installed between one side of the input shaft and the first hollow shaft, such that the input shaft and the first hollow shaft are synchronously connected selectively to each other, and a second connection mechanism may be installed between the other side of the input shaft and the second hollow shaft, such that the input shaft and the second hollow shaft are synchronously connected selectively to each other.

According to another exemplary embodiment of the present disclosure, a transmission for a hybrid vehicle includes: an input shaft connected to an engine, an output shaft disposed in parallel with the input shaft, a hollow shaft installed on an outer peripheral surface of the input shaft, a motor connected to the hollow shaft, a speed-shifting output part provided between the hollow shaft and the output shaft, and a synchronizer synchronously connecting selectively input gears of the hollow shaft to the speed-shifting output part.

The transmission for a hybrid vehicle may further include a connection mechanism synchronously connecting selectively the hollow shaft to the input shaft.

The connection mechanism may be configured of a synchronizer.

The hollow shaft may have two or more input gears formed on an outer peripheral surface thereof, and the synchronizer may be installed between the input gears of the hollow shaft to synchronously connect selectively the input gears to the speed-shifting output part.

The speed-shifting output part may include a speed-shifting shaft disposed in parallel with the output shaft, the speed-shifting shaft having a plurality of speed-shifting gears having different dimensions.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
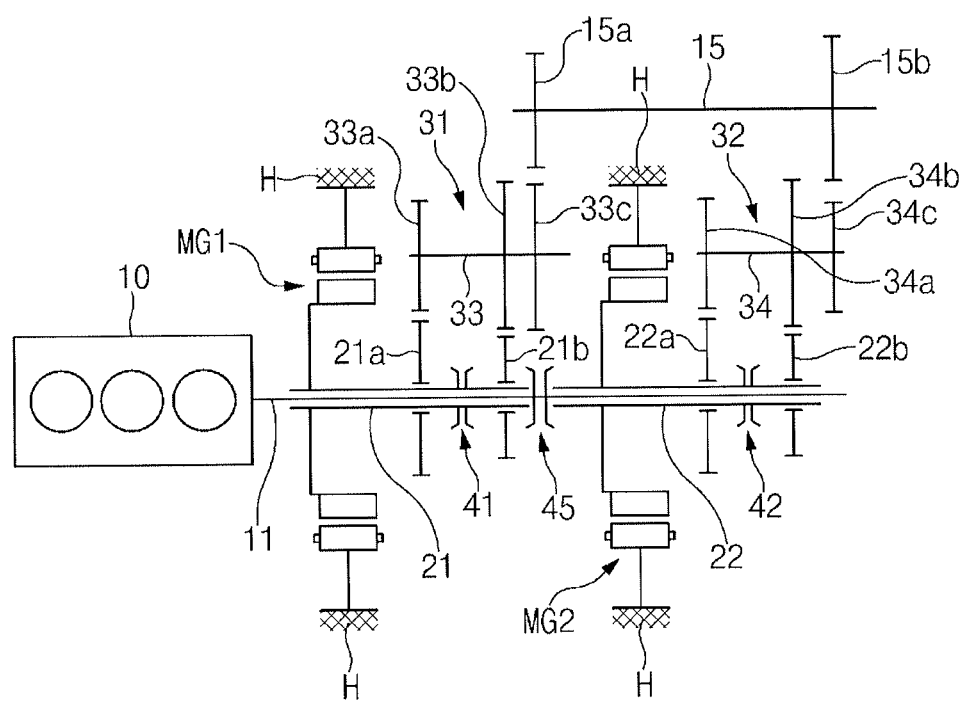
FIG. 1 is a configuration diagram showing a transmission for a hybrid vehicle according to an exemplary embodiment of the present disclosure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a diagram showing a transmission for a hybrid vehicle according to an exemplary embodiment of the present disclosure.

As shown in FIG. 1, the transmission for a hybrid vehicle according to an exemplary embodiment of the present disclosure is configured to include an input shaft 11 connected to an engine 10, an output shaft 15 disposed in parallel with the input shaft 11, one or more hollow shafts 21 and 22 installed on an outer peripheral surface of the input shaft 11, one or more motors MG1 and MG2 connected to the hollow shafts 21 and 22, speed-shifting output parts 31 and 32 provided between the hollow shafts 21 and 22 and the output shaft 15, and synchronizers 41 and 42 synchronously connecting selectively the hollow shafts 21 and 22 to the speed-shifting output parts 31 and 32.

The input shaft 11 is installed in a transmission housing H so as to be lengthily extended, and one side of the input shaft 11 is connected to the engine 10 to receive driving force of the engine 10.

The output shaft 15 is disposed outside the transmission housing H so as to be in parallel with the input shaft 11, and has one or more output gears 15a and 15b provided on an outer peripheral surface thereof.

The hollow shafts 21 and 22 have hollow parts formed therein, and the input shaft 11 is rotatably installed in the hollow shafts 21 and 22, such that the hollow shafts 21 and 22 are disposed on the outer peripheral surface of the input shaft 11. Therefore, the hollow shafts 21 and 22 may be freely rotated with respect to the input shaft 11.

Figure 3:
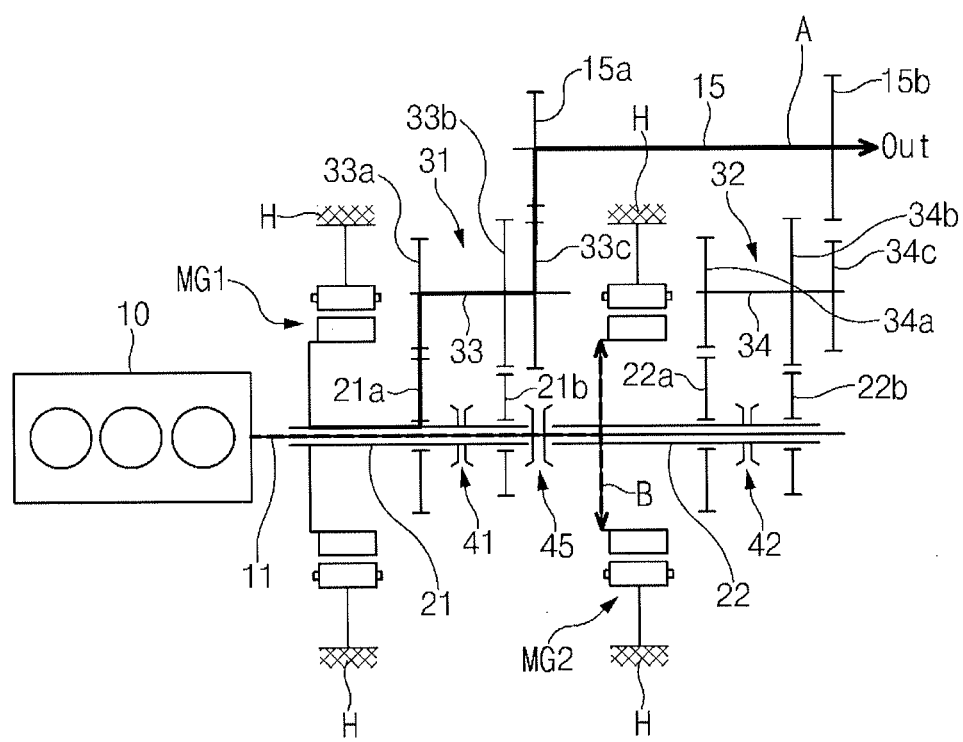
FIG. 3 is a power train in a series mode of the transmission for a hybrid vehicle according to an exemplary embodiment of the present disclosure.

According to an exemplary embodiment, the hollow shafts 21 and 22 includes a first hollow shaft 21 installed on an outer peripheral surface of one side of the input shaft 11 and a second hollow part 22 installed on an outer peripheral surface of the other side of the input shaft 11, as shown in FIG. 3.

The first hollow shaft 21 has two or more first input gears 21a and 21b formed on an outer peripheral surface thereof, wherein the two or more first input gears 21a and 21b may be configured so that dimensions thereof such as the numbers of teeth, diameters, and the like, are different from each other, thereby providing different input speeds to a first speed-shifting output part 31.

The second hollow shaft 22 has two or more second input gears 22a and 22b formed on an outer peripheral surface thereof, wherein the two or more second input gears 22a and 22b may be configured so that dimensions thereof such as the numbers of teeth, diameters, and the like, are different from each other, thereby providing different input speeds to a second speed-shifting output part 32.

The motors MG1 and MG2 are connected to the hollow shafts 21 and 22 to rotate the hollow shafts 21 and 22.

According to an exemplary embodiment, the motors MG1 and MG2 includes a first motor MG1 connected to the first hollow shaft 21 and a second motor MG2 connected to the second hollow shaft 22, as shown in FIG. 3.

The first motor MG1 has a stator fixed to the transmission housing H and a rotor connected to the first hollow shaft 21. Therefore, the first motor MG1 rotates the first hollow shaft 21.

The second motor MG2 has a stator fixed to the transmission housing H and a rotor connected to the second hollow shaft 22. Therefore, the second motor MG2 rotates the second hollow shaft 22.

The first speed-shifting output part 31 has a first speed-shifting shaft 33 disposed in parallel with the first hollow shaft 21, wherein the first speed-shifting shaft 33 has a plurality of first speed-shifting gears 33a to 33c formed on an outer peripheral surface thereof. The plurality of first speed-shifting gears 33a to 33c are configured so that dimensions thereof such as the numbers of teeth, diameters, and the like, are different from each other, such that they may be selectively engaged with the input gears 21a and 21b of the first hollow shafts 21.

The second speed-shifting output part 32 has a second speed-shifting shaft 34 disposed in parallel with the second hollow shaft 22, wherein the second speed-shifting shaft 34 has a plurality of second speed-shifting gears 34a to 34c formed on an outer peripheral surface thereof. The plurality of second speed-shifting gears 34a to 34c are configured so that dimensions thereof such as the numbers of teeth, diameters, and the like, are different from each other, such that they may be selectively engaged with the input gears 22a and 22b of the second hollow shafts 22.

Meanwhile, the first speed-shifting gears 33a to 33c of the first speed-shifting shaft 33 and the second speed-shifting gears 34a to 34c of the second speed-shift shaft 34 are selectively engaged with the output gears 15a and 15b of the output shaft 15, thereby making it possible to implement speed-shifting multi-staging.

The synchronizers 41 and 42 are configured so as to synchronously connect the hollow shafts 21 and 22 to the speed-shifting output parts 31 and 32.

According to an exemplary embodiment, the synchronizers 41 and 42 includes a first synchronizer 41 synchronously connecting the first hollow shaft 21 to the first speed-shifting output part 31 and a second synchronizer 42 synchronously connecting the second hollow shaft 22 to the second speed-shifting output part 32.

The first synchronizer 41 is installed between the first input gears 21a and 21b of the first hollow shaft 21 and is configured so as to synchronously connect selectively the first input gears 21a and 21b to the first speed-shifting gears 33a to 33c of the first speed-shifting output part 31.

The second synchronizer 42 is installed between the second input gears 22a and 22b of the second hollow shaft 22 and is configured so as to synchronously connect selectively the second input gears 22a and 22b to the second speed-shifting gears 34a to 34c of the second speed-shifting output part 32.

As described above, according to the present disclosure, driving force of the motors MG1 and MG2 is synchronously connected selectively to the speed-shifting output parts 31 and 32 through the synchronizers 41 and 42 to implement speed-shifting multi-staging in electric vehicle (EV)/hybrid electric vehicle (HEV) modes, thereby making it possible to increase speed-shifting efficiency and power transfer efficiency and significantly improve fuel efficiency.

Particularly, according to the present disclosure, since two motors MG1 and MG2 may be synchronously connected individually to two speed-shifting output parts 31 and 32 using two synchronizers to perform both of series and parallel modes, an optimal driving state may be implemented.

In addition, according to the present disclosure, since a capacity of a power electronics (PE) component such as a motor, or the like, may be decreased through the speed-shifting multi-staging in the EV/HEV modes by the synchronizers 41 and 42, a cost decrease and an efficiency increase may be expected.

Further, according to the present disclosure, the synchronizers 41 and 42 are used instead of intermitting mechanisms driven by oil pressure, such as a clutch, a brake, and the like, for the purpose of the speed-shifting multi-staging, thereby making it possible to increase the speed-shifting efficiency to improve the fuel efficiency.

A connection mechanism 45 is installed at a portion at which the first and second hollow shafts 21 and 22 are adjacent to each other and is configured so as to synchronously connect selectively the first and second hollow shafts 21 and 22 to the input shaft 11.

According to an exemplary embodiment of the present disclosure, the connection mechanism 45 is configured of a synchronizer to synchronously connect selectively the first and second hollow shafts 21 and 22 to the input shaft 11.

As described above, according to the present disclosure, the first and second hollow shafts 21 and 22 are synchronously connected to the input shaft 11 by the connection mechanism 45, such that a series mode may be easily implemented without a separate decelerator for start-up of the engine and an existing starter generator may be omitted, thereby making it possible to decrease a manufacturing cost.

Driving modes of the transmission for a hybrid vehicle according to an exemplary embodiment of the present disclosure configured as described above will be described in detail with reference to FIGS. 2 to 4.

Figure 2:
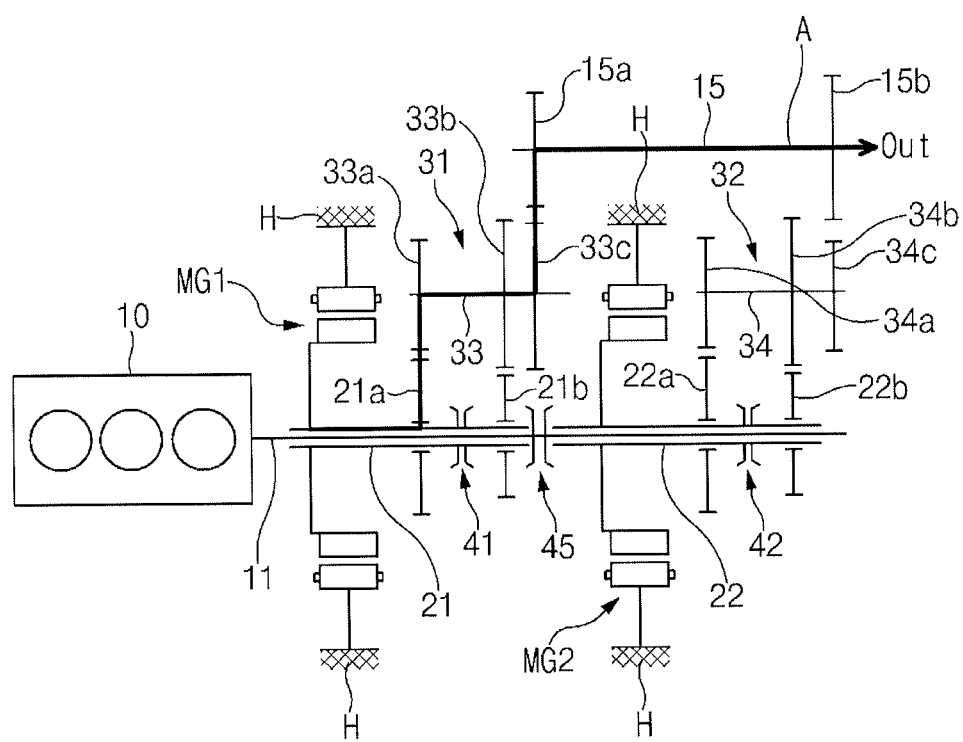
FIG. 2 is a power train in an electric vehicle (EV) mode of the transmission for a hybrid vehicle according to an exemplary embodiment of the present disclosure.

In an EV driving mode, as shown in FIG. 2, the first motor MG1 is driven, such that driving force of the first motor MG1 is transferred to the first speed-shifting output part 31 through the first hollow shaft 21 and is then transferred to the output shaft 15 (See a direction of an arrow A).

In a series driving mode, as shown in FIG. 3, the first motor MG1 is driven, such that driving force of the first motor MG1 is transferred to the first speed-shifting output part 31 through the first hollow shaft 21 and is then transferred to the output shaft 15 (See a direction of an arrow A), and driving force of the engine 10 is transferred to the second motor MG2 through the second hollow shaft 22 (See a direction of an arrow B) in a state in which the input shaft 11 and the second hollow shaft 22 are connected to each other by the connection mechanism 45, such that the second motor MG generates electric power.

Figure 4:
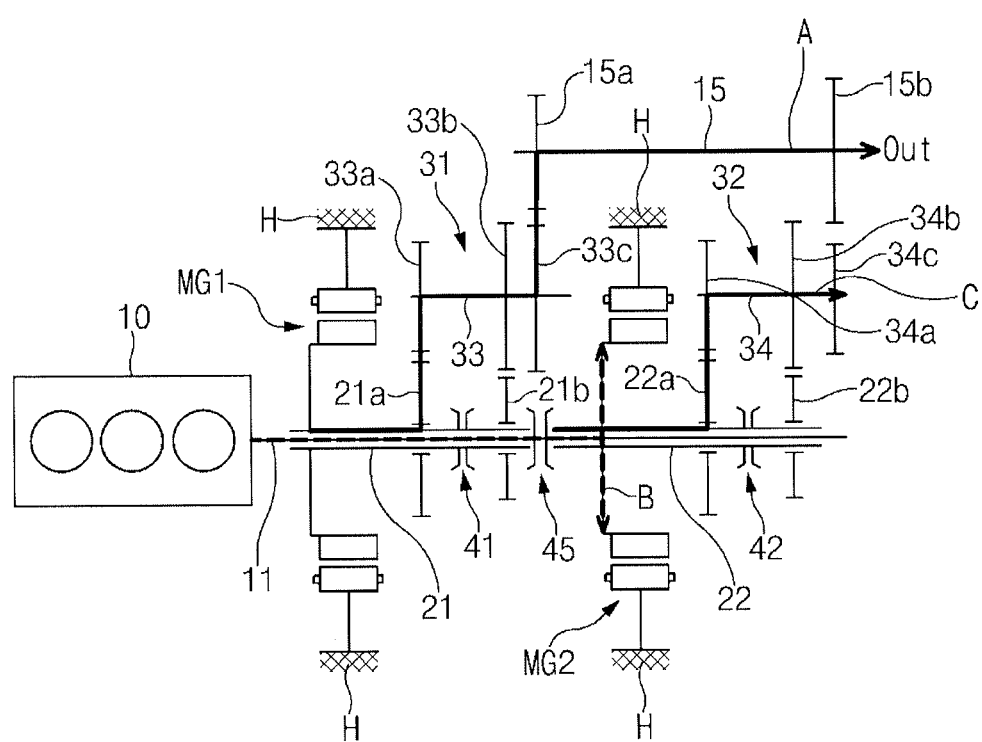
FIG. 4 is a power train in a parallel mode of the transmission for a hybrid vehicle according to an exemplary embodiment of the present disclosure.

In a parallel driving mode, as shown in FIG. 4, the first motor MG1 is driven, such that driving force of the first motor MG1 is transferred to the first speed-shifting output part 31 through the first hollow shaft 21 and is then transferred to the output shaft 15 (See a direction of an arrow A), driving force of the engine 10 is transferred to the second motor MG2 through the second hollow shaft 22 (See a direction of an arrow B) in a state in which the input shaft 11 and the second hollow shaft 22 are connected to each other by the connection mechanism 45, such that the second motor MG generates electric power, and driving force of the second motor MG2 is transferred to the second speed-shifting output part 32 (See a direction of an arrow C) and is then transferred to the output shaft 15.

Meanwhile, a speed-shifting multi-staging process in the EV driving mode of the transmission for a hybrid vehicle according to an exemplary embodiment of the present disclosure will be described below with reference to FIGS. 5A to 5D.

Figure 5A:
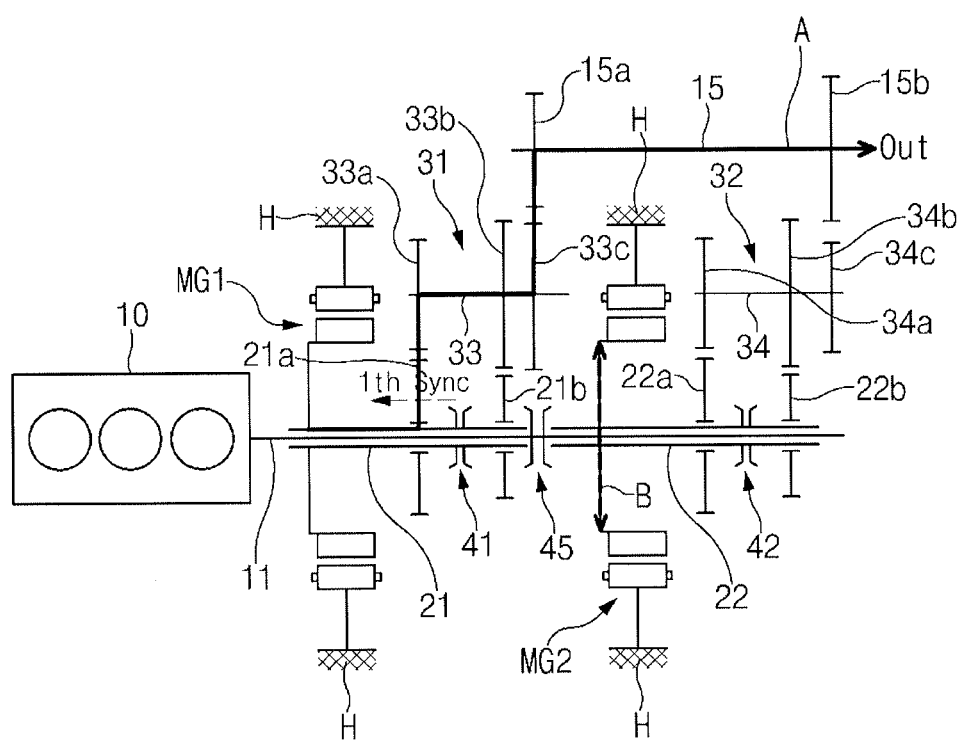
FIG. 5A, FIG. 5B, FIG. 5C and FIG. 5D are views showing a 1th speed-shifting process in the EV mode of the transmission for a hybrid vehicle according to an exemplary embodiment of the present disclosure.
Figure 5B:
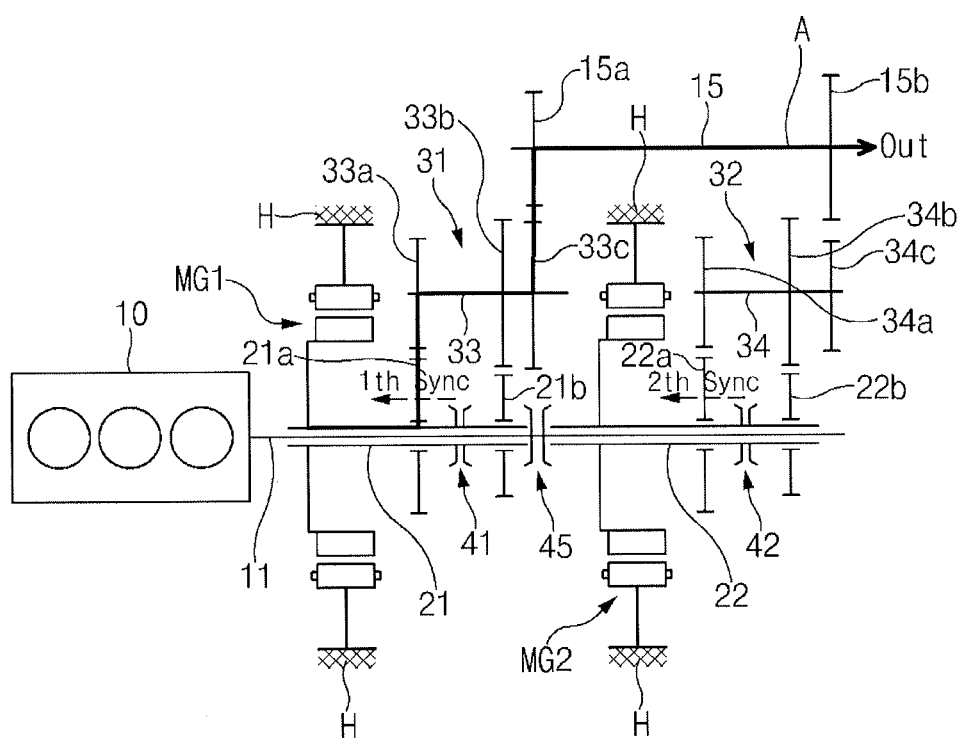

As shown in FIG. 5A, in an initial process of the EV driving mode, the first motor MG1 is driven, such that driving force of the first motor MG1 is transferred to the first speed-shifting output part 31 through the first hollow shaft 21 (See a direction of an arrow A), and speed synchronization at a 2th sync is performed through the second motor MG2 by the first synchronizer 41 during a period in which the first speed-shifting output part 31 is driven in a 1th EV driving mode (See a direction of an arrow B). Here, the speed synchronization is performed after the series driving mode is stopped when the transmission for a hybrid vehicle is in a state in which serial driving is made by the second motor MG2.

Then, as shown in FIG. 5, after the first speed-shifting output part 31 is synchronized at the 2th sync by the first synchronizer 41, the second motor MG2 is stopped, and the second speed-shifting output part 32 is coupled at the 2th sync by the second synchronizer 42.

Figure 5C:
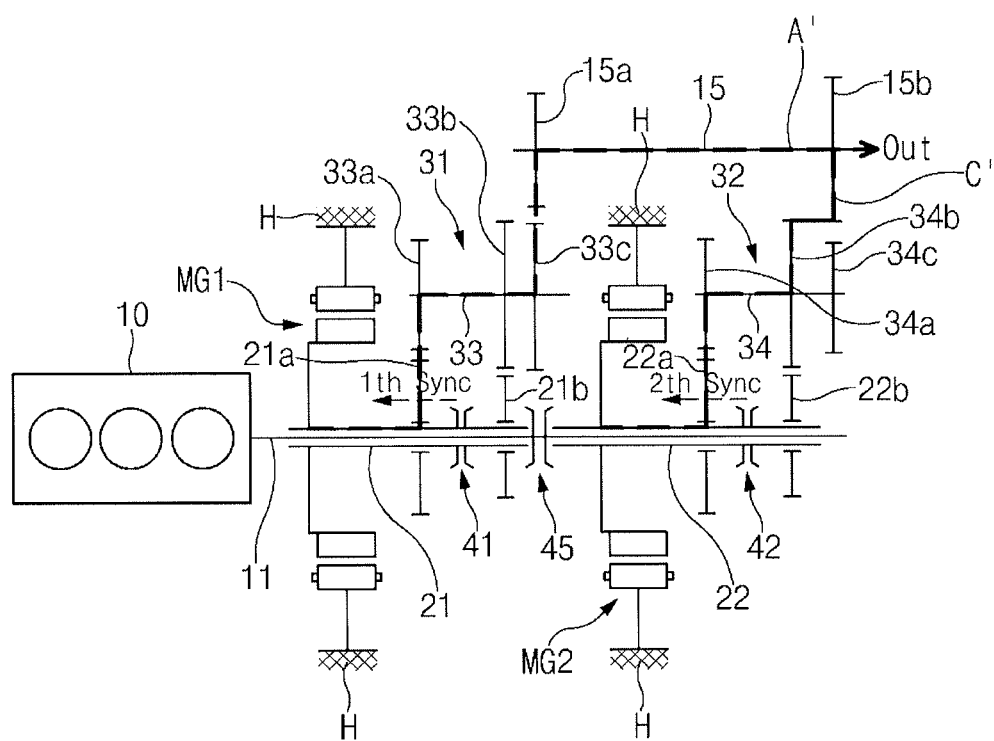

Next, as shown in FIG. 5C, the first and second speed-shifting output parts 31 and 32 are coupled at the 2th sync by the first and second synchronizers 41 and 42 to maintain speed-shifting feeling and maintain power performance through a torque control of the first and second motors MG1 and MG2 (See arrows A' and C').

Figure 5D:
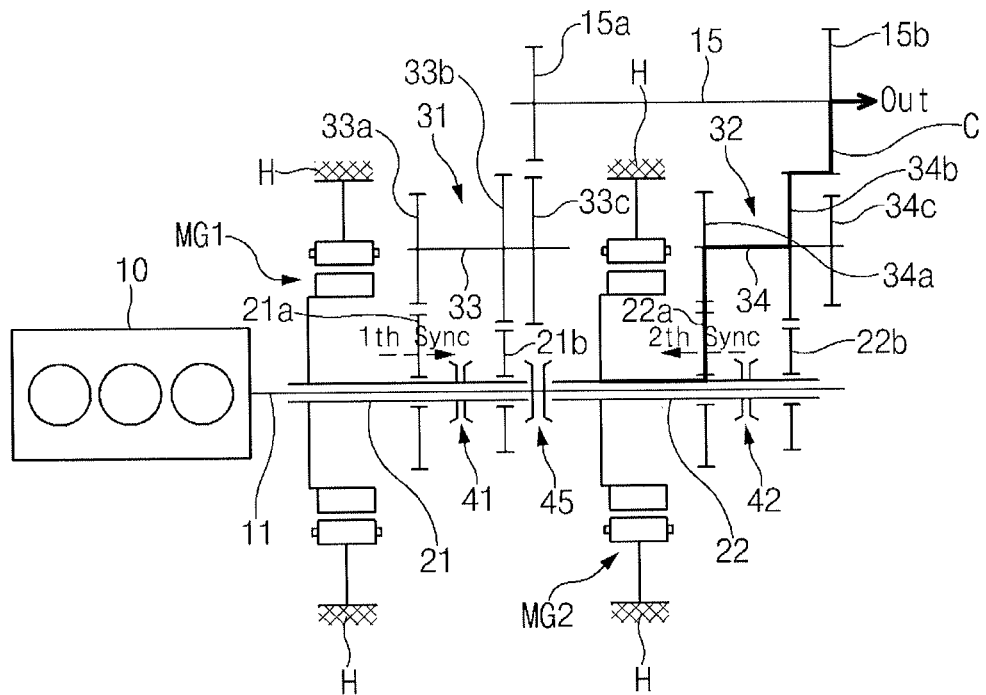

Then, as shown in FIG. 5D, in a state in which the first motor MG1 is stopped, the first synchronizer 41 is maintained as neutrality at the 1th sync, and 2th driving by the second motor MG2 is performed (See a direction of an arrow C). In this case, series driving by the first motor MG1 is possible.

Figure 6:
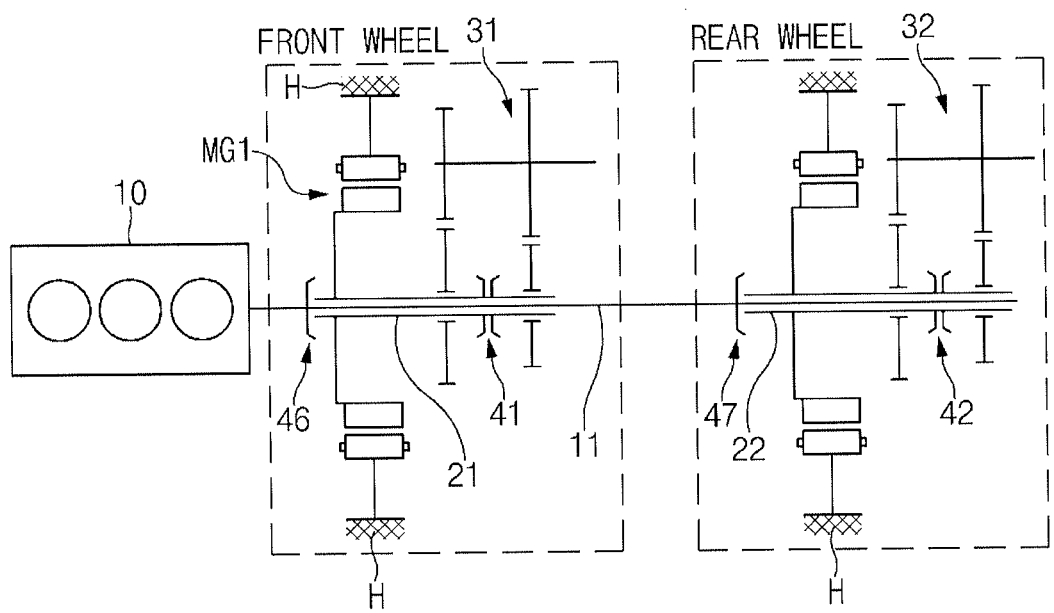
FIG. 6 is a configuration diagram showing a transmission for a hybrid vehicle according to another exemplary embodiment of the present disclosure.

Meanwhile, FIG. 6 is a diagram showing a transmission for a hybrid vehicle according to another exemplary embodiment of the present disclosure.

As shown in FIG. 6, in the transmission for a hybrid vehicle according to another exemplary embodiment of the present disclosure, the first hollow shaft 21, the first motor MG1, the first synchronizer 41, and the first speed-shifting output part 31 are disposed at a portion adjacent to a front wheel of the vehicle and the second hollow shaft 22, the second motor MG2, the second synchronizer 42, and the second speed-shifting output part 32 are disposed at a portion adjacent to rear wheel of the vehicle, thereby making it possible to implement four-wheel drive.

In addition, the input shaft 11 is extended between the front and rear wheels of the vehicle, a first connection mechanism 46 is installed between one side of the input shaft 11 and the first hollow shaft 21, such that the input shaft 11 and the first hollow shaft 21 may be synchronously connected selectively to each other, and a second connection mechanism 47 is installed between the other side of the input shaft 11 and the second hollow shaft 22, such that the input shaft 11 and the second hollow shaft 22 may be synchronously connected selectively to each other.

As described above, according to exemplary embodiments of the present disclosure, driving force of the motors is synchronously connected selectively to the speed-shifting output parts through the synchronizers to implement the speed-shifting multi-staging in the EV/HEV modes, thereby making it possible to increase the speed-shifting efficiency and the power transfer efficiency and significantly improve the fuel efficiency.

Particularly, according to exemplary embodiments of the present disclosure, since the two motors may be synchronously connected individually to the two speed-shifting output parts using two synchronizers to perform both of the series and parallel modes, the optimal driving state may be implemented.

According to exemplary embodiments of the present disclosure, the hollow shafts are synchronously connected to the input shaft by the connection mechanism (synchronizer), such that the series mode may be easily implemented without the separate decelerator for start-up of the engine and the existing starter generator may be omitted, thereby making it possible to decrease the manufacturing cost.

Particularly, according to exemplary embodiments of the present disclosure, since the capacity of the power electronics (PE) component such as the motor, or the like, may be decreased through the speed-shifting multi-staging in the EV/HEV modes by the synchronizers, the cost decrease and the efficiency increase may be expected.

Further, according to exemplary embodiments the present disclosure, the synchronizers are used instead of the intermitting mechanisms driven by the oil pressure, such as the clutch, the brake, and the like, for the purpose of the speed-shifting multi-staging, thereby making it possible to increase the speed-shifting efficiency to improve the fuel efficiency.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a vehicle, comprising:
    an input shaft connected to an engine;
    an output shaft disposed in parallel with the input shaft;
    a first hollow shaft installed on an outer peripheral surface of a first side of the input shaft;
    a second hollow shaft installed on an outer peripheral surface of a second side of the input shaft;
    a first motor connected to the first hollow shaft;
    a second motor connected to the second hollow shaft;
    a first speed-shifting output part provided between the first hollow shaft and the output shaft;
    a second speed-shifting output part provided between the second hollow shaft and the output shaft;
    a first synchronizer synchronously connecting the first hollow shaft to the first speed-shifting output part; and
    a second synchronizer synchronously connecting the second hollow shaft to the second speed-shifting output part.

2. The transmission for the vehicle according to claim 1, wherein the first hollow shaft has two or more first input gears formed on an outer peripheral surface thereof, and the first synchronizer is installed between the two or more first input gears of the first hollow shaft to synchronously connect selectively the first input gears to the two or more first speed-shifting output part, and the second hollow shaft has two or more second input gears formed on an outer peripheral surface thereof, and the second synchronizer is installed between the two or more second input gears of the second hollow shaft to synchronously connect selectively the two or more second input gears to the second speed-shifting output part.

3. The transmission for the vehicle according to claim 2, wherein the first speed-shifting output part has a first speed-shifting shaft and a plurality of first speed-shifting gears formed on an outer peripheral surface of the first speed-shifting shaft, and the second speed-shifting output part has a second speed-shifting shaft and a plurality of second speed-shifting gears formed on an outer peripheral surface of the second speed-shifting shaft.

4. The transmission for the vehicle according to claim 3, wherein the first synchronizer is configured to synchronously connect selectively the two or more first input gears to the first speed-shifting gears of the first speed-shifting shaft, and the second synchronizer is configured to synchronously connect selectively the second input gears to the two or more second speed-shifting gears of the second speed-shifting shaft.

5. The transmission for the vehicle according to claim 1, wherein a connection mechanism is installed at a portion at which the first and second hollow shafts are adjacent to each other and synchronously connects selectively the first and second hollow shafts to the input shaft.

6. The transmission for the vehicle according to claim 5, wherein the connection mechanism is a synchronizer.

7. The transmission for the vehicle according to claim 1, wherein the first hollow shaft, the first motor, the first synchronizer, and the first speed-shifting output part are disposed at a portion adjacent to a front wheel of the vehicle, and the second hollow shaft, the second motor, the second synchronizer, and the second speed-shifting output part are disposed at a portion adjacent to a rear wheel of the vehicle.

8. The transmission for the vehicle according to claim 7, wherein the input shaft is extended between the front and rear wheels of the vehicle, a first connection mechanism is installed between a first side of the input shaft and the first hollow shaft, such that the input shaft and the first hollow shaft are synchronously connected selectively to each other, and a second connection mechanism is installed between a second side of the input shaft and the second hollow shaft, such that the input shaft and the second hollow shaft are synchronously connected selectively to each other.

9. A transmission for a vehicle, comprising:
an input shaft connected to an engine;
an output shaft disposed in parallel with the input shaft;
a hollow shaft installed on an outer peripheral surface of the input shaft;
a motor connected to the hollow shaft;
a speed-shifting output part provided between the hollow shaft and the output shaft; and
a synchronizer synchronously connecting selectively input gears of the hollow shaft to the speed-shifting output part,
wherein the speed-shifting output part includes a speed-shifting shaft disposed in parallel with the output shaft, the speed-shifting shaft having a plurality of speed-shifting gears having different dimensions.

10. The transmission for the vehicle according to claim 9, further comprising a connection mechanism synchronously connecting selectively the hollow shaft to the input shaft.

11. The transmission for the vehicle according to claim 10, wherein the connection mechanism is a synchronizer.

12. The transmission for the vehicle according to claim 9, wherein the hollow shaft has two or more input gears formed on an outer peripheral surface thereof, and the synchronizer is installed between the two or more input gears of the hollow shaft to synchronously connect selectively the input gears to the speed-shifting output part.

* * * * *